(12) United States Patent
Mehta et al.

(10) Patent No.: US 11,580,533 B2
(45) Date of Patent: Feb. 14, 2023

(54) METHOD AND SYSTEM FOR OPTIMIZATION OF DATA STORAGE FOR DISTRIBUTED LEDGERS

(71) Applicant: MASTERCARD INTERNATIONAL INCORPORATED, Purchase, NY (US)

(72) Inventors: Ankur Mehta, Haryana (IN); Awinash Pandey, Haryana (IN); Saugandh Datta, Greater Noida (IN); Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 260 days.

(21) Appl. No.: 16/708,667

(22) Filed: Dec. 10, 2019

(65) Prior Publication Data
US 2021/0174349 A1 Jun. 10, 2021

(51) Int. Cl.
*G06Q 20/36* (2012.01)
*H04L 9/06* (2006.01)

(52) U.S. Cl.
CPC ..... *G06Q 20/3676* (2013.01); *G06Q 20/3672* (2013.01); *H04L 9/0637* (2013.01)

(58) Field of Classification Search
CPC ........... G06Q 20/3676; G06Q 20/3672; G06Q 2220/00; G06Q 20/02; G06Q 20/223;
(Continued)

(56) References Cited

U.S. PATENT DOCUMENTS

| 7,051,035 | B2 * | 5/2006 | Meek | ..................... G01C 21/32 |
| | | | | 707/999.102 |
| 2011/0016384 | A1 * | 1/2011 | Shagam | ................ G06F 40/109 |
| | | | | 715/242 |

(Continued)

FOREIGN PATENT DOCUMENTS

| CN | 108563796 A | * | 9/2018 | |
| CN | 110264172 A | * | 9/2019 | ........... G06Q 20/065 |
| CN | 110543526 A | * | 12/2019 | .............. G06Q 20/38 |

OTHER PUBLICATIONS

Andreas M. Antonopoulos, Mastering Bitcoin, Dec. 2014, O'Reilly (Year: 2014).*

*Primary Examiner* — Neha Patel
*Assistant Examiner* — Chunling Ding
(74) *Attorney, Agent, or Firm* — Panitch Schwarze Belisario & Nadel LLP

(57) ABSTRACT

A method for optimizing blockchain storage size through use of relative values includes: receiving, by a blockchain node in a blockchain network that manages a blockchain, a plurality of blockchain data values, each including unspent transaction outputs, at least one destination address, and, for each destination address, an original currency amount; identifying a base value; modifying the original currency amount included in each blockchain data value to be a relative currency amount based on a difference between the identified base value and the original currency amount; generating a new block, the new block including a block header and the modified plurality of blockchain data values; and transmitting the generated new block to a plurality of additional nodes in the blockchain network.

12 Claims, 5 Drawing Sheets

(58) Field of Classification Search
CPC ... H04L 9/0637; H04L 9/3297; H04L 9/3247; H04L 9/3239; H04L 2209/38; H04L 9/50
See application file for complete search history.

(56) References Cited

U.S. PATENT DOCUMENTS

| | | | | |
|---|---|---|---|---|
| 2018/0150856 A1* | 5/2018 | Zhu | .................... | G06Q 30/0204 |
| 2018/0276663 A1* | 9/2018 | Arora | .................... | G06Q 20/065 |
| 2018/0315309 A1* | 11/2018 | Becker | .................. | H04L 9/0637 |
| 2020/0127844 A1* | 4/2020 | van der Laak | ....... | H04L 9/3247 |
| 2020/0372037 A1* | 11/2020 | Yang | .................... | G06F 16/252 |
| 2021/0011163 A1* | 1/2021 | Zhang | .................. | G01S 7/4808 |

* cited by examiner

METHOD AND SYSTEM FOR OPTIMIZATION OF DATA STORAGE FOR DISTRIBUTED LEDGERS

FIELD

The present disclosure relates to optimizing blockchain storage size through use of relative values, specifically using an alternative blockchain implementation where currency amount and other values are relative to base values, enabling smaller data sizes in transactions, thereby reducing overall file size of a blockchain.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

However, while the immutability strengthens as the chain gets longer, the data size for the blockchain also increases. As new transactions are added, the storage size required to store a copy of the blockchain also increases, reaching into gigabytes after a relatively short period of time (e.g., in less than 10 years, the Bitcoin blockchain exceeded 200 gigabytes). Such a size may be a limitation on smaller computer systems and may be exceedingly difficult for file transfers, particularly noting that the blockchain would likely add new transactions after a transfer, resulting in additional transfers. Thus, there is a need for an implementation of blockchain that can have smaller data sizes for transactions, thus reducing the storage size of the blockchain as a whole.

SUMMARY

The present disclosure provides a description of systems and methods for optimizing blockchain storage size through the use of relative values. When a new blockchain transaction is received by a node, the node identifies a base value to use, either inside the block that the new transaction will be included in or elsewhere in the blockchain, such as in the genesis block. The currency amount for the new transaction is modified to be relative based on the base value, which can enable a smaller file size. For example, if the transaction amount is 15326, but the base value is 15000, the amount in the transaction as it is added to the blockchain can be reduced to 326, sizing two bits. Similar techniques can also be used on the unspent transaction output indices in a transaction, saving several bits for each index as well. A reduction of ten bits per transaction can, for a chain such as Bitcoin that exceeds 500 million transactions with 350,000 added per day, have a reduction of 600 megabytes, significantly reducing the file size. The methods and systems discussed herein thereby provide for a significantly smaller storage size for blockchains through the use of relative values.

A method for optimizing blockchain storage size through use of relative values includes: receiving, by a receiver of a blockchain node in a blockchain network that manages a blockchain, a plurality of blockchain data values, where each blockchain data value includes at least one or more unspent transaction outputs, at least one destination address, and, for each of the at least one destination address, an original currency amount; identifying, by a processor of the blockchain node, a base value; modifying, by the processor of the blockchain node, the original currency amount included in each of the plurality of blockchain data values for each of the at least one destination address to be a relative currency amount based on a difference between the identified base value and the original currency amount; generating, by the processor of the blockchain node, a new block, where the new block includes a block header and the modified plurality of blockchain data values, the block header including at least a block reference value, a timestamp, and a data reference value based on the modified plurality of blockchain data values; and transmitting, by a transmitter of the blockchain node, the generated new block to a plurality of additional nodes in the blockchain network.

A system for optimizing blockchain storage size through use of relative values includes: a blockchain network that manages a blockchain; a plurality of additional nodes in the blockchain network; and a blockchain node in the blockchain network, the blockchain node including a receiver receiving a plurality of blockchain data values, where each blockchain data value includes at least one or more unspent transaction outputs, at least one destination address, and, for each of the at least one destination address, an original currency amount, a processor identifying a base value, modifying the original currency amount included in each of the plurality of blockchain data values for each of the at least one destination address to be a relative currency amount based on a difference between the identified base value and the original currency amount, and generating a new block, where the new block includes a block header and the modified plurality of blockchain data values, the block header including at least a block reference value, a timestamp, and a data reference value based on the modified plurality of blockchain data values, and a transmitter transmitting the generated new block to a plurality of additional nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Optimization of Blockchain Storage Size

Figure 1:
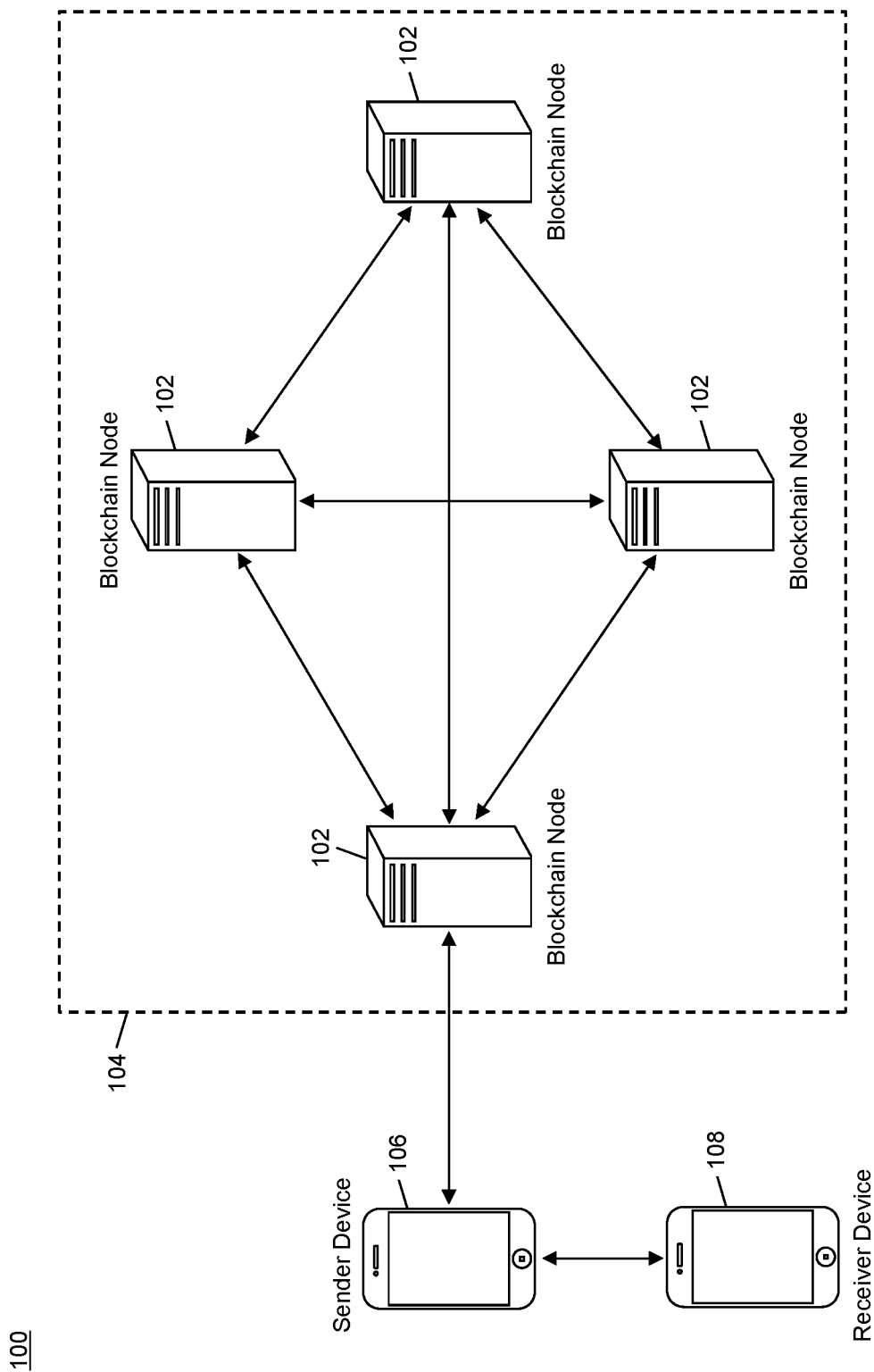
FIG. 1 is a block diagram illustrating a high level system architecture for optimizing blockchain storage size through relative values in accordance with exemplary embodiments.

FIG. 1 illustrates a system 100 for optimizing the storage size of a blockchain through the use of relative values in blockchain transactions and block headers.

Figure 2:
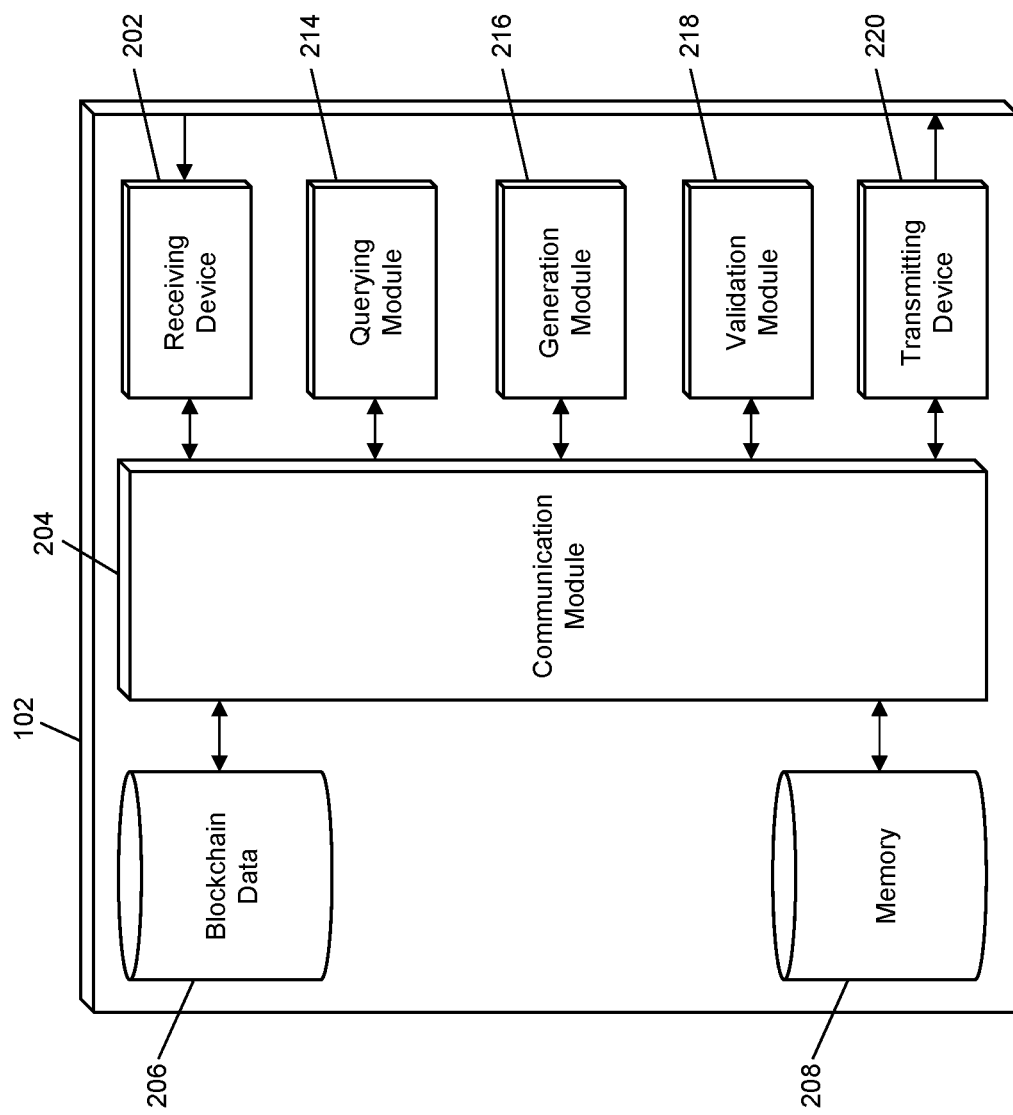
FIG. 2 is a block diagram illustrating a blockchain node of the system of FIG. 1 for optimizing blockchain storage size in accordance with exemplary embodiments.
Figure 5:
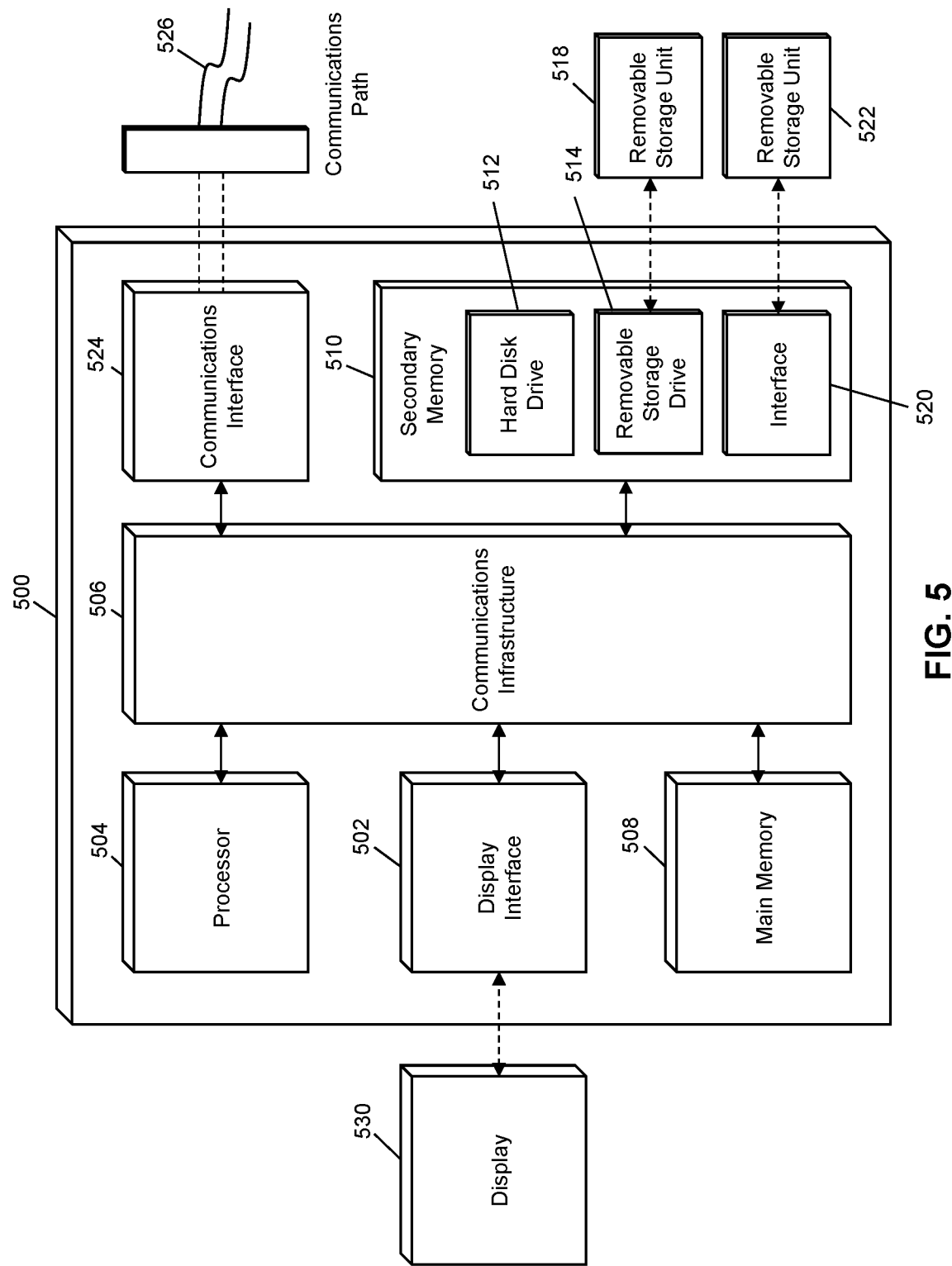
FIG. 5 is a block diagram illustrating a computer system architecture in accordance with exemplary embodiments.

The system 100 may include a blockchain network 104. The blockchain network 104 may be comprised of a plurality of blockchain nodes 102. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, blockchain nodes 102 may be configured to modify data in a new blockchain transaction to reduce the data size thereof, thereby reducing the overall storage size of the blockchain compared to traditional blockchains. The sender device 106 may submit a new blockchain transaction to the blockchain node 102 using any suitable communication network and method. The new blockchain transaction may include a digital signature, one or more unspent transaction outputs, one or more destination addresses, and, for each destination address, an original currency amount. The unspent transaction outputs may be a transaction index that is a unique reference for the earlier blockchain transaction that is referenced, where the sender device 106 had received currency that it wants to spend in the new blockchain transaction. Each transaction in the blockchain may have a unique index value, including the new blockchain transaction if it is confirmed and added to the blockchain.

The blockchain node 102 may receive the new blockchain transaction and may modify one or more values thereof to reduce the storage size of the transaction when added to the blockchain. In an exemplary embodiment, the currency amount for each transaction may be modified from the original currency amount to a relative amount, which is relative to a base value. The base value may be stored in any suitable location depending on the implementation of the blockchain. In one embodiment, the base value may be the currency amount of the first transaction included in the blockchain. For example, if the first transaction ever has an amount of 10000, and a new transaction is received for 10500 or for 8500, the transaction amount for the new transaction may be modified to be "500" or "−1500" respectively. In another embodiment, the base value may be the currency amount for the first transaction in the new block that will include the new blockchain transaction. In yet another embodiment, a base value may be stored in the genesis block that is not directly associated with any specific transaction. In another embodiment, each block may have its own base value, which may be stored in the block header thereof. For example, the blockchain node 102 may identify an average (e.g., mean, median, etc.) transaction amount for all of the transactions that will be included in a new block, where that average will serve as the base value for the block. In some cases, the average value may be stored in the block header. In other cases, the average value may not be stored, as it may be independently generated by any blockchain node 102 when analyzing any transactions in the block, to further reduce data storage size.

Once the base value has been identified, the blockchain node 102 can modify the original currency amount in the new blockchain transaction to be relative to that base value. In some embodiments, the blockchain node 102 may similarly modify other values in the new blockchain transaction. For instance, the new blockchain transaction may be assigned its own transaction index, and may then modify the unspent transaction output indices in the new blockchain transaction to be relative to the index of the new blockchain transaction. For example, if the new blockchain transaction is assigned and index of 2839501, and the unspent transaction output used in the new blockchain transaction has an index of 2838962, the blockchain node 102 may modify the unspent transaction output index to be "539" (e.g., where it being below the new transaction's index does not have to be indicated as all unspent transaction outputs would have a lower index due to ordering). In the above example, the new index value is four bits smaller. In a blockchain where indices may be 16 bit values, the same modification would be 13 bits smaller. For transactions that include multiple unspent transaction outputs, the data size savings would be significant, especially on a scale of millions of transactions.

In some embodiments, data stored in a block header may also be modified to be relative based on other data. For example, the timestamp in a new block may be relative to the timestamp of the prior block in the blockchain. For instance, each timestamp may be represented as the number of seconds that have passed since the prior block was added to the chain, as opposed to a UNIX timestamp. In such an example, the size of a timestamp may be reduced from 16 bits to one, two, or three bits depending on the length of time before the new block is added from the prior block.

The methods and systems discussed herein enable blockchain nodes 102 to create an immutable blockchain that has a smaller data storage size than traditional blockchain implementations. A smaller data storage size can improve system performance, reduce bandwidth utilized in data transfers (e.g., for the blockchain as a whole, as well as for each individual transaction and block during confirmation processes), and enable systems to operate as blockchain nodes 102 that may be otherwise unable. The use of relative values in place of the absolute values in traditional blockchains provide for a concrete and consistent reduction in the data size of transactions, which can compound into a significantly reduced file size over the life of a blockchain.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with new transactions for confirmation, confirmed blockchain transactions, new blocks for confirmation, confirmed blocks for addition to the blockchain, messages regarding block confirmations, etc. The receiving device 202 may also be configured to receive data signals electronically transmitted by sender devices 106, which may be superimposed or otherwise encoded with new blockchain transactions, public keys, digital signatures, confirmation messages for precedence transactions, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 208. The memory 208 may be configured to store data for use by the blockchain node 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, base value data, etc.

The blockchain node 102 may also include blockchain data 206, which may be stored in the memory 208 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 102, fee data, base value data, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 208 of the blockchain node 102 to identify information stored therein. The querying module 214 may then output the identified information to an appropriate engine or module of the blockchain node 102 as necessary. The querying module 214 may, for example, execute a query on the blockchain data 206 to identify base values to be used in the modification of data values in a new blockchain transaction to be relative to a respective base value.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain. The generation module 216 may also be configured to generate a modified blockchain data value for a new blockchain transaction where original currency amounts and other data values therein may be modified to be relative to a base value.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device 106 is authorized to use the transaction outputs included in the new transaction submission and that the transaction outputs have not been previously used to transfer currency in another transaction. The validation module 218 may also be configured to validate digital signatures using public keys and suitable signature generation algorithms.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other blockchain nodes 102 that are superimposed or otherwise encoded with new blockchain data values, new blocks for confirmation, confirmed blocks, messages regarding block or transaction confirmations, and other data used in the operation and management of the blockchain. The transmitting device 220 may also be configured to electronically transmit data signals to sender devices 106, which may be superimposed or otherwise encoded with confirmation requests, notifications regarding transaction processing, etc.

Optimization of Data Size of a Blockchain Transaction

Figure 3:
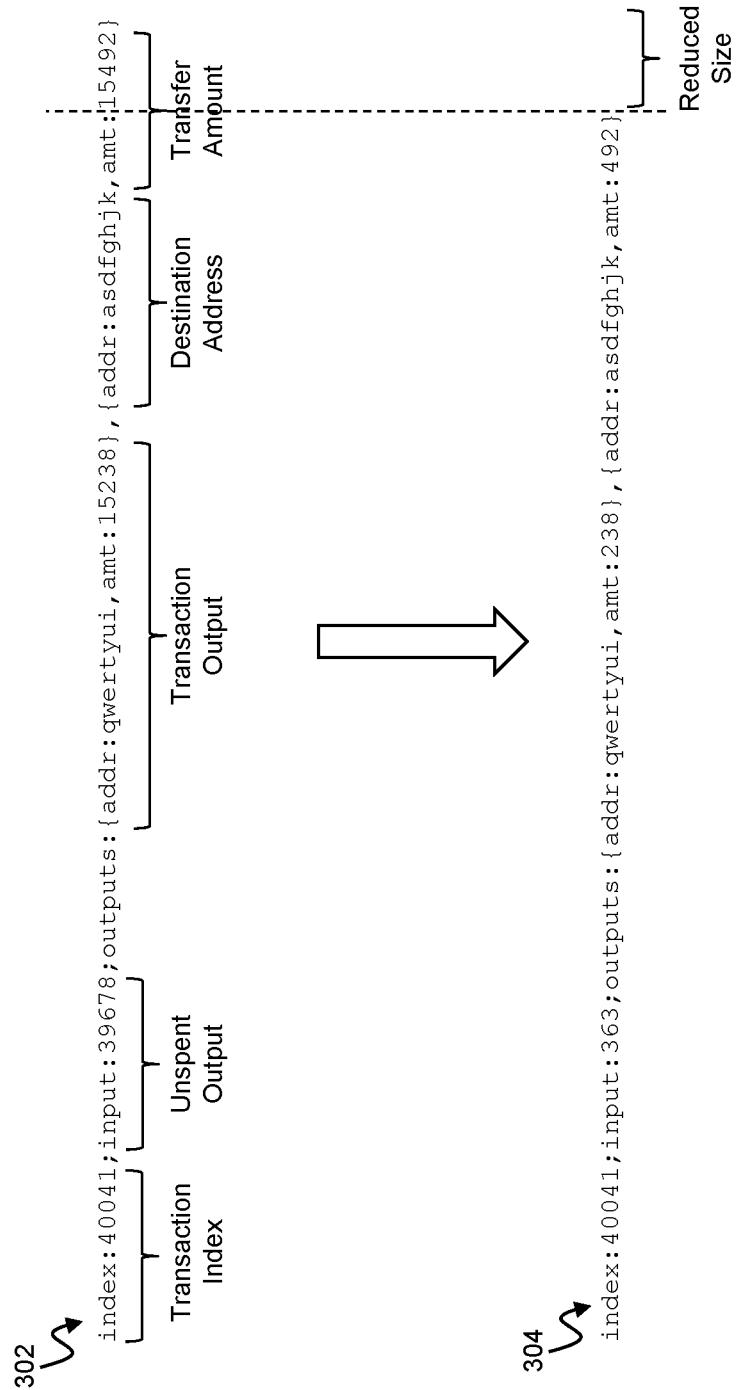
FIG. 3 is a diagram illustrating the reduction of storage size for a blockchain transaction through the use of relative values in accordance with exemplary embodiments.

FIG. 3 illustrates the use of relative values as discussed above to reduce the data storage size of a blockchain transaction.

As illustrated in FIG. 3, a blockchain transaction 302 may include a plurality of data values. In the illustrated example, the blockchain transaction 302 includes a transaction index for the blockchain transaction 302, an index for the unspent transaction output that is being spent in the blockchain transaction 302, and two transaction outputs. Each transaction output includes a destination blockchain address and a corresponding transfer amount that is being sent to that address.

As also illustrated in FIG. 3, a blockchain node 102 may modify the blockchain transaction 302 into a modified transaction 304, by changing data values to be relative to other values. In the illustrated example, the unspent transaction output may be modified to be relative to the transaction index for the blockchain transaction 302. The unspent transaction output is thus modified from "39678" to "363," a reduction of two bits. Similarly, the transfer amount in each of the transaction outputs may be modified to be relative to a base value of 15000, reducing the transfer amounts from "15238" and "15492" to "238" and "492," respectively, a reduction of two bits each. The resulting modified transaction 304 is six bits smaller than the original blockchain transaction 302.

In a blockchain where hundreds of thousands of transactions are added to the chain each day, a reduction of six bits per transaction results in the present blockchain adding 73 megabytes less than a traditional blockchain for each 100,000 transactions. Furthermore, FIG. 3 illustrates indices and transaction amounts of five bits for easier readability. In many blockchains, such as in Bitcoin, transaction indices are 32 bits and transaction amounts are 64 bits. Similar reductions in such a blockchain transaction where the transaction has two inputs and three outputs would save 241 bits (e.g., 29 for each unspent transaction output index and 61 for each transfer amount). For 100,000 of such transactions, this is a reduction of 2.87 gigabytes in the present blockchain. Accordingly, the data storage size reduction provided by the methods and systems discussed herein can be significant compared to traditional blockchain implementations.

Exemplary Method for Optimizing Blockchain Storage Size

Figure 4:
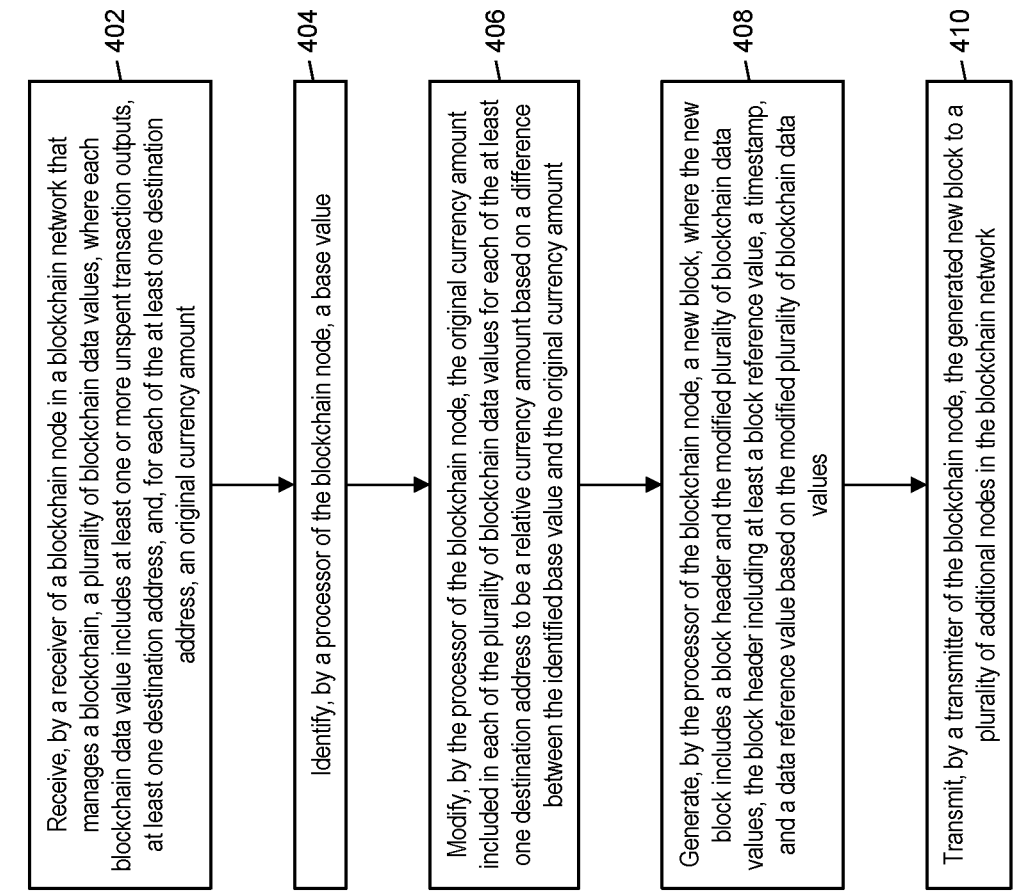
FIG. 4 is a flow chart illustrating an exemplary method for optimizing blockchain storage size through use of relative values in accordance with exemplary embodiments.

FIG. 4 illustrates a method 400 for optimizing blockchain storage size through the use of relative values for at least the currency amount being transferred in a blockchain transaction.

In step 402, a plurality of blockchain data values may be received by a receiver (e.g., receiving device 202) of a blockchain node (e.g., blockchain node 102) in a blockchain network (e.g., blockchain network 104) that manages a blockchain, where each blockchain data value includes at least one or more unspent transaction outputs, at least one destination address, and, for each of the at least one destination address, an original currency amount. In step 404, a base value may be identified by a processor (e.g., querying module 214) of the blockchain node. In one embodiment, the base value may be stored in a genesis block in the blockchain. In another embodiment, the base value may be the original currency amount in a first blockchain data value of the plurality of blockchain data values. In a further embodiment, the first blockchain data value may be first in the plurality of blockchain data values stored in the generated new block.

In step 406, the original currency amount included in each of the plurality of blockchain data values for each of the at least one destination address may be modified by the processor (e.g., generation module 216) of the blockchain node to be a relative currency amount based on a difference between the identified base value and the original currency amount. In step 408, a new block may be generated by the processor (e.g., generation module 216) of the blockchain node, where the new block includes a block header and the modified plurality of blockchain data values, the block header including at least a block reference value, a timestamp, and a data reference value based on the modified plurality of blockchain data values. In step 410, the generated new block may be transmitted by a transmitter (e.g., transmitting device 220) of the blockchain node to a plurality of additional nodes in the blockchain network.

In one embodiment, the block header may further include the base value. In some embodiments, the method 400 may further include identifying, by the processor of the blockchain node, an average currency amount based on the original currency amount included in each of the plurality of blockchain data values for each of the at least one destination address, wherein the base value is the average currency amount. In one embodiment, the timestamp may be a difference in time between a present time of the blockchain node and a relative time. In a further embodiment, the relative time may be stored in a genesis block in the blockchain. In another further embodiment, the relative time may be a timestamp of a previous block in the blockchain.

Computer System Architecture

FIG. 5 illustrates a computer system 500 in which embodiments of the present disclosure, or portions thereof, may be implemented as computer-readable code. For example, the blockchain nodes 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for optimizing blockchain storage size through use of relative values. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for optimizing blockchain storage size through use of relative values, comprising:
    storing, in a memory of a blockchain node in a blockchain network that manages a blockchain, blockchain data associated with the blockchain, the blockchain data including of one or more blocks;
    receiving, by a receiver of the blockchain node, one or more blockchain data values, where each blockchain data value includes at least one or more unspent transaction outputs, at least one destination address, and, for each of the at least one destination address, an original currency amount;
    identifying, by a processor of the blockchain node, a base value, the base value being an average currency amount based on the original currency amount included in each of the one or more blockchain data values for each of the at least one destination address;
    modifying, by the processor of the blockchain node, the original currency amount included in each of the blockchain data values for each of the at least one destination address to be a relative currency amount based on a difference between the identified base value and the original currency amount, wherein a digital representation of the relative currency amount is at least one bit smaller than the original currency amount;
    generating, by the processor of the blockchain node, a new block, where the new block includes a block header and the modified one or more blockchain data values, the block header including at least a block reference value, a timestamp, the base value, and a data reference value based on the modified one or more blockchain data values, the modified one or more blockchain data values including the at least one or more unspent transaction outputs, the at least one destination address, and, for each of the at least one destination address, the relative currency amount;
    transmitting, by a transmitter of the blockchain node, the generated new block to a plurality of additional nodes in the blockchain network for validation;
    receiving, by the receiver of the blockchain node, updated blockchain data, the updated blockchain data including the verified new block; and
    storing, by the memory of the blockchain node, the updated blockchain data.

2. The method of claim 1, wherein the base value is stored in a genesis block in the blockchain.

3. The method of claim 1, wherein the base value is the original currency amount in a first blockchain data value of the one or more blockchain data values.

4. The method of claim 3, wherein the first blockchain data value is first in the one or more blockchain data values stored in the generated new block.

5. The method of claim 1, wherein the timestamp is a difference in time between a present time of the blockchain node and a relative time.

6. The method of claim 5, wherein the relative time is stored in a genesis block in the blockchain.

7. A system for optimizing blockchain storage size through use of relative values, comprising:
    a blockchain network that manages a blockchain;
    a plurality of additional nodes in the blockchain network; and
    a blockchain node in the blockchain network, the blockchain node including:
        a memory storing blockchain data associated with the blockchain, the blockchain data including of one or more blocks;
        a receiver receiving one or more blockchain data values, where each blockchain data value includes at least one or more unspent transaction outputs, at least one destination address, and, for each of the at least one destination address, an original currency amount,
        a processor,
            identifying a base value, the base value being an average currency amount based on the original currency amount included in each of the one or more blockchain data values for each of the at least one destination address,
            modifying the original currency amount included in each of the one or more blockchain data values for each of the at least one destination address to be a relative currency amount based on a difference between the identified base value and the original currency amount, wherein a digital representation of the relative currency amount is at least one bit smaller than the original currency amount, and generating a new block, where the new block includes a block header and the modified one or more blockchain data values, the block header including at least a block reference value, a timestamp, the base value, and a data reference value based on the modified one or more blockchain data values, the modified one or more blockchain data values including the at least one or more unspent transaction outputs, the at least one destination address, and, for each of the at least one destination address, the relative currency amount, and a transmitter transmitting the generated new block to a plurality of additional nodes in the blockchain network for validation;

the receiver further receiving updated blockchain data, the updated blockchain data including the verified new block; and the memory further storing the updated blockchain data.

8. The system of claim 7, wherein the base value is stored in a genesis block in the blockchain.

9. The system of claim 7, wherein the base value is the original currency amount in a first blockchain data value of the one or more blockchain data values.

10. The system of claim 9, wherein the first blockchain data value is first in the one or more blockchain data values stored in the generated new block.

11. The system of claim 7, wherein the timestamp is a difference in time between a present time of the blockchain node and a relative time.

12. The system of claim 11, wherein the relative time is stored in a genesis block in the blockchain.

* * * * *